Figure 1:
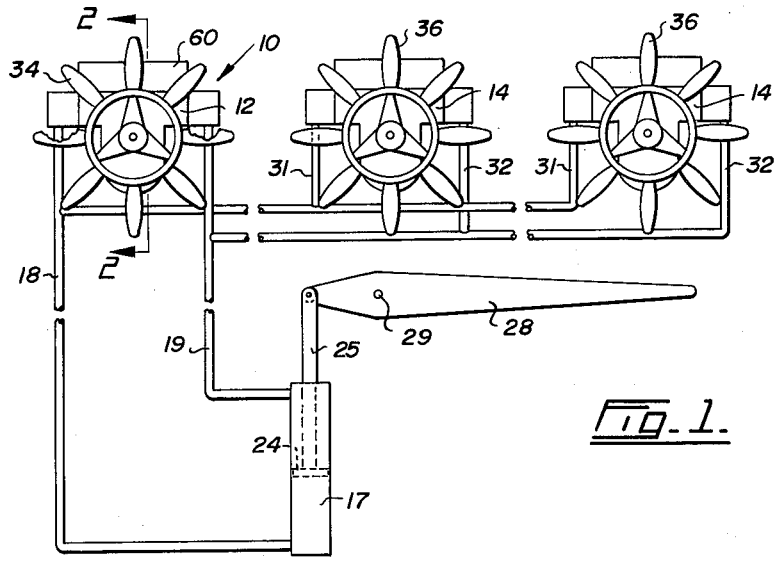

Feb. 8, 1966          D. SMITH          3,233,407

HYDRAULIC CONTROL APPARATUS AND CONTROL VALVE THEREFOR

Filed March 23, 1964          3 Sheets-Sheet 1

INVENTOR
DARCY SMITH
BY
Fetherstonhaugh & Co.
ATTORNEYS

INVENTOR
DARCY SMITH
BY
Fetherstonhaugh & Co.
ATTORNEYS

Feb. 8, 1966 D. SMITH 3,233,407
HYDRAULIC CONTROL APPARATUS AND CONTROL VALVE THEREFOR
Filed March 23, 1964 3 Sheets-Sheet 3

INVENTOR
DARCY SMITH
BY
Featherstonhaugh & Co.
ATTORNEYS

United States Patent Office 3,233,407
Patented Feb. 8, 1966

3,233,407
HYDRAULIC CONTROL APPARATUS AND
CONTROL VALVE THEREFOR
Darcy Smith, 1052 Verdier Ave., Brentwood Bay,
British Columbia, Canada
Filed Mar. 23, 1964, Ser. No. 354,044
16 Claims.  (Cl. 60—52)

This invention relates to hydraulic control apparatus for different purposes and control valves therefor.

This apparatus is particularly designed for controlling a rudder to steer a boat, but it may be used for controlling any device such as, for example, the throttle of an engine or a gear shifting lever. The apparatus is particularly advantageous if it is desired to operate or control something from a number of different positions or stations. It is very useful in a boat where it is desired to be able to steer it from several stations throughout the boat. The apparatus may also be used in a boat to control the throttle of an engine or the gear shift lever from different stations.

For the sake of convenience, the invention will be described in connection with the operation of a rudder to steer a boat, but it is to be understood that any other device requiring movement for operation may be controlled by this apparatus.

An object of the present invention is the provision of hydraulic control apparatus including one or more control stations, each of which has turning means, such as a steering wheel, and so designed that the wheel of any station may be turned to operate a rudder or other device to which the apparatus is connected without any of the other wheels turning, and when all wheels are released, the rudder or device is automatically locked in the position to which it is turned.

Another object is the provision of hydraulic control apparatus of the type described and so designed that air may be quickly and easily bled from the entire system at any time, and that any air that may get into the system during operation is automatically bled from the fluid during the operation of the apparatus.

A further object is the provision of control valves for hydraulic operating apparatus in which all moving parts operate in and are lubricated by the hydraulic fluid of the system.

This invention contemplates a hydraulic control valve comprising a housing having a gear pump therein operable selectively to direct fluid through check valves to either of two operating ports in the housing. A reservoir is adapted to direct fluid through check valves to opposite sides of this pump, and return passages in the housing are adapted to direct fluid through check valves from the operating ports to the reservoir. Valve means is mounted in the housing and operable to close either return passage and simultaneously open the other return passage, said valve means having means thereon adapted to open the check valve of either return passage when said valve means is moved to open the latter return passage. Passage means extend from opposite sides of the pump to direct pressure fluid therefrom to operate the valve means to close either return passage when the pump is directing fluid to the operating ports of the latter return passage.

The hydraulic control valve is operatively connected to a slave cylinder having a piston which, in turn, is connected to the device being operated, such as a rudder. The slave cylinder has a piston and rod assembly with the rod removably connected to the piston, said rod extending out of the cylinder. Passage means is formed in the piston and rod assembly. This passage means is so located that when the piston rod is moved from a normal position relative to the piston, the passage means brings the parts of the cylinder on opposite sides of the piston into communication with each other. With this arrangement, the hydraulic fluid in the system can be pumped therethrough very quickly without moving the piston in the slave cylinder. Any air trapped in the system is quickly moved to the reservoir, which is preferably located at the highest point of the system, and this reservoir is open to atmosphere so that the air is discharged from the fluid. When the piston rod is moved back to its normal position relative to the piston, the two sections of the cylinder on opposite sides of the piston are cut off from each other, and the apparatus can then be operated to extend and retract the piston rod relative to the cylinder.

Figure 4:
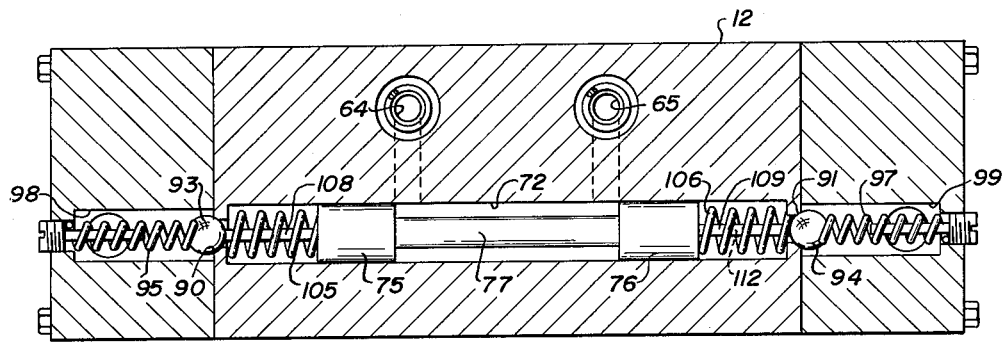
Figure 2:
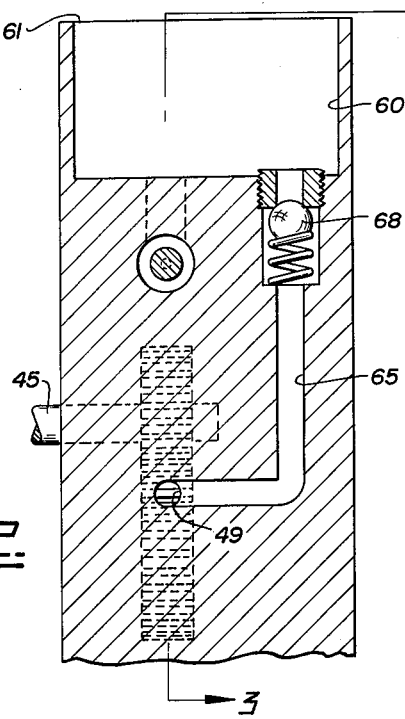
Figure 3:
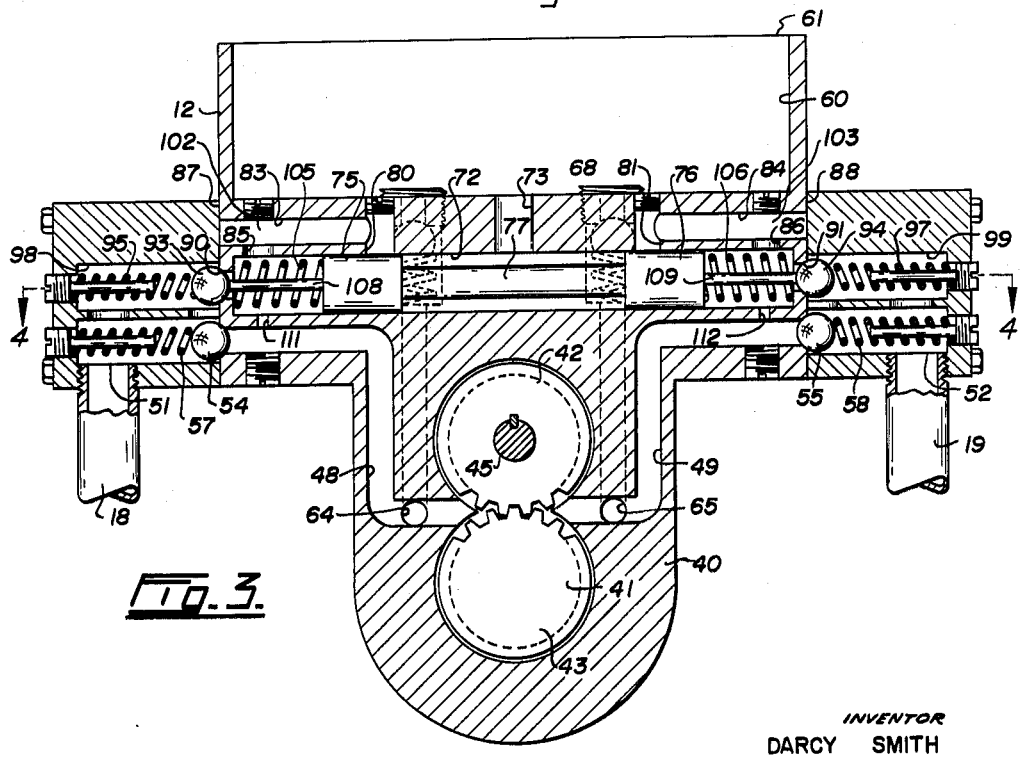
Figure 5:
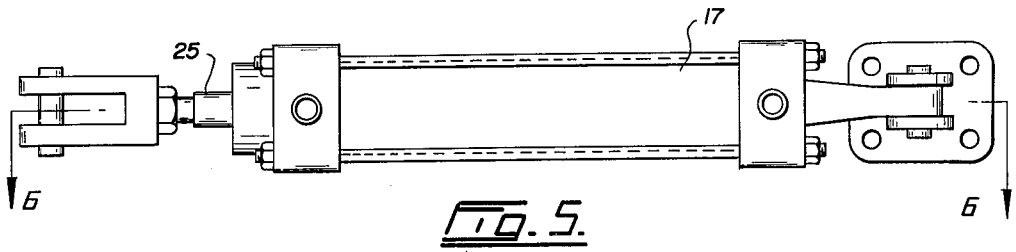
Figure 6:
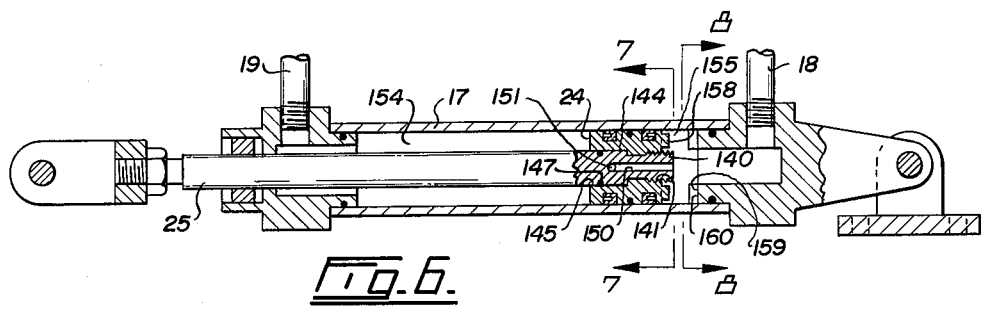
Figure 7:
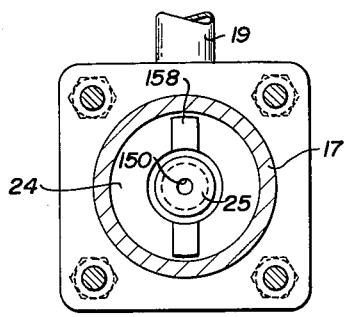
Figure 8:
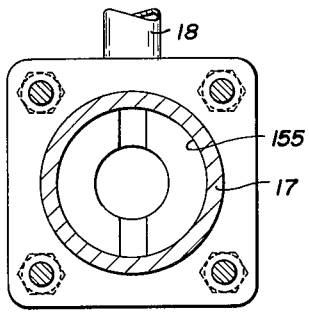

A preferred embodiment of this invention is illustrated by way of example in the accompanying drawings, in which, FIGURE 1 is a diagrammatic view of hydraulic control apparatus according to this invention, including a main control valve and two station control valves connected in parallel to the system, FIGURE 2 is an enlarged section taken on the line 2—2 of FIGURE 1, FIGURE 3 is a section taken on the line 3—3 of FIGURE 2, FIGURE 4 is a section taken on the line 4—4 of FIGURE 3, FIGURE 5 is an enlarged plan view of the slave cylinder, FIGURE 6 is a longitudinal section taken on the line 6—6 of FIGURE 5, FIGURE 7 is a cross section taken on the line 7—7 of FIGURE 6, and FIGURE 8 is another cross section taken on the line 8—8 of FIGURE 6.

Referring to FIGURE 1 of the drawings, 10 is hydraulic control apparatus including a main control valve 12 and one or more station control valves 14. Control valve 12 is directly connected to a slave cylinder 17 by pipes 18 and 19. A piston 24 is slidably mounted in cylinder 17, and a piston rod 25 projects from an end of said cylinder and is connected to the device to be operated, which in this case is a rudder 28 swingably mounted on a pivot 29.

Each station control valve is connected by conduits 31 and 32 in parallel to conduits 18 and 19, respectively. Main control valve 12 has a steering wheel 34, while each valve 14 has a steering wheel 36.

Referring to FIGURES 2 to 4, the main control valve 12 includes a housing 40 having a gear pump 41 operatively mounted therein and including intermeshing gears 42 and 43. One of these gears, in this example gear 42, is keyed to a shaft 45 which extends out of the housing, and upon which steering 34 is fixedly mounted so that rotation of this wheel turns gears 42 and 43 to operate pump 41. Main passages 48 and 49 extend from opposite sides of pump 41 to operating ports 51 and 52 in the housing to which pipes 18 and 19 are respectively connected. Ball check valves 54 and 55 are located in passages 48 and 49 near ports 51 and 52, said valves opening in the direction of said ports and being normally held closed by springs 57 and 58.

A reservoir 60 is mounted on or forms part of housing 40, said reservoir preferably having an opening 61 in the top thereof which maintains said reservoir in communication with the atmosphere outside this apparatus. Supply passages 64 and 65 extend from reservoir 60 through housing 40 to main passages 48 and 49, respectively, adjacent the opposite sides of pump 41. Passages 64 and 65 have check valves 67 and 68 therein which open away from the reservoir.

A bore 72 is formed in housing 40 above pump 41 and beneath reservoir 60. The central part of this bore is connected to the reservoir by a passageway 73. A valve unit in the form of a pair of spaced shuttle valves 75 and 76 are slidably mounted on bore 72, and are interconnected by a rod 77 of lesser diameter than the bore. Valves 75 and 76 normally close ports 80 and 81 formed in the side wall of bore 72, one on each side of central passageway 73. Passages 83 and 84 extend from ports 80 and 81, respectively, to ports 85 and 86 formed in the wall of bore 72 near ends 87 and 88 thereof. Additional ports 90 and 91 are formed in ends 87 and 88 of the bore, said ports being normally closed by ball check valves 93 and 94 which are held in their respective closed positions by springs 95 and 97. Passages 98 and 99 extend from bore ports 90 and 91 respectively to operating ports 51 and 52. Passageway 73, bore 72, port 80, passages 83, ports 85 and 90, and passage 98 form a return passage 102 extending from operating port 52 to reservoir 60 and controlled by check valve 93. Similarly, passageway 73, bore 72, port 81, passage 84, ports 86 and 91, and passage 99 form a return passage 103 extending from operating port 52 to reservoir 60 and controlled by check valve 94.

Shuttle valves 75 and 76 are preferably normally retained in positions closing ports 80 and 81 of the return passages by springs 105 and 106 mounted in bore 72 between the ends 87 and 88 thereof and the adjacent ends of said shuttle valves. Fingers 108 and 109 extend from valves 75 and 76 to ball check valves 93 and 94, respectively. These fingers are of such length that when valves 75 and 76 close both ports 80 and 81, valves 93 and 94 are closed. However, if the shuttle valves are shifted along bore 72 to cause valve 75 to uncover port 80 of return passage 102, valve 93 of said return passage is opened by finger 108. On the other hand, if the shuttle valves are moved to cause valve 76 to uncover port 81 of return passage 103, finger 109 unseats ball 94 of the latter return passage.

Shuttle valves 75 and 76 are shifted along bore 72 by pressure fluid from pump 41 so that when the pump is directing pressure fluid along main passage 48, the valves are shifted so that valve 76 uncovers port 81 and opens valve 94 of return passage 103, and when the pump directs pressure fluid through main passage 49, the valves are shifted so that valve 75 uncovers port 80 and opens check valve 93 of return passage 102. This is accomplished simply by providing a port 111 between main passage 48 and bore 72 between shuttle valve 76 and the end 87 of said bore. Another port 112 is provided between main passage 49 and the portion of bore 72 between its end 88 and shuttle valve 76.

When the steering wheel 34 of main control valve 12 is rotated to operate gear pump 41 to direct pressure fluid through main passage 48, this fluid is directed through operating port 51 and pipe 18 to move piston 24 of slave cylinder 17 in one direction. At the same time, the pressure fluid passes through port 111 into bore 72 to shift shuttle valves 75 and 76 to uncover return port 81 while maintaining return port 80 closed. This movement causes finger 109 to unseat return valve 94 so that return passage 103 is now open from operating port 52 to reservoir 60, thereby allowing fluid from slave cylinder 17 to travel from pipe 19 to the reservoir. During this time, the pump draws oil from the reservoir though supply passage 65, while check valve 67 in supply passage 64 keeps the latter closed. When wheel 34 is turned in the opposite direction to cause pump 41 to direct pressure fluid through main passage 49 and check valve 55 to operating port 52, this fluid passes through port 112 into bore 72 to shift shuttle valves 75 and 76 so as to uncover return port 80 while keeping return port 81 closed. This brings the reservoir in communication with operating port 51 through return passage 102, since valve 93 is unseated by finger 103 at this time. The pump draws fluid from the reservoir through supply passage 64, while check valve 68 keeps supply passage 65 closed. With this arrangement, when pump 41 is operated to direct pressure fluid to one operating port, the other operating port is connected to the reservoir, and vice versa. When port 51 or 52 is connected to reservoir 60, check valve 54 or 55 is closed while check valve 93 or 94 is unseated by finger 108 or 109. When pump 41 stops operating, the shuttle valves 75 and 76 are returned to their normal positions by springs 105 and 106, thereby closing return passages 102 and 103 at ports 80 and 81. In addition to this, valves 93 and 94 are closed by their respective springs. This arrangement makes it possible to operate either of the control valves 14 without affecting the main valve 12.

Each station control valve 14 is a duplicate of main control valve 12. The only difference between control valve 12 and control valves 14 is that it is preferable to close the reservoir of valves 14. Each operating port of each valve 14 is connected to the corresponding operating port of valve 12 by pipes 31–18 and 32–19. When either a steering wheel 34 or a steering wheel 36 is turned the gear pump of valve 12 or valve 14 is rotated to move fluid through the system which includes pipes 18, 19, 31 and 32 and cylinder 17. When one control valve is being operated, the check valves 54, 55, 93 and 94 of the other control valves prevent the fluid in the system from entering the latter control valves thereby ensuring all the moving fluid travelling between cylinder 17 and the control valve being operated.

Slave cylinder 17 has been designed so that air can be bled from all of the fluid in the system after it has been installed or at any time should air get into the system during operation of it. As it is a closed system, there is little likelihood of air getting into it once the system has been purged.

Rod 25 is connected to piston 24 is such a way that it can, when desired, be shifted relative to said piston. In this example, the inner end 140 of rod 25 is threaded and is screwed into a threaded socket 141 in the piston. The rod is also formed with an enlargement 144 which fits into a socket 145 formed in the piston when the rod is in its normal position relative to said piston. A suitable seal, such as an O ring 147 is provided around the rod and fits into socket 145. A passage 150 extends inwardly from the inner end of rod 25 and opens out laterally from the rod at 151 between seal 147 and the bottom of socket 145.

Normally, passage 150 does not serve any purpose since its end 151 is blocked off by the wall of socket 145 of piston 24, said passage end 151 being separated from the end section 154 of cylinder 17 by seal 147. The opposite end of passage 150 at the inner end of rod 25 is in communication with the end section 155 of the cylinder.

Piston rod 25 can be turned to unscrew its end 140 relative to piston socket 141 until passage end 151 is moved into communication with end section 154 of cylinder 17. At this time, passage 150 maintains end section 154 in communication with the opposite end section 155 so that fluid can circulate from one section to the other through piston 24. Suitable means is provided for preventing the piston from rotating when rod 25 is rotated. This may be accomplished by making cylinder 17 of square cross section and piston 24 of the same cross section. However, a simpler method is to provide piston 24 with a key 158 projecting from the end thereof facing the end 159 of the cylinder. This cylinder end 159 is provided with a keyway 160 therein of corresponding shape to key 158. With this arrangement, when it is desired to turn rod 25 without turning piston 24, the rod is moved longitudinally of cylinder 17 until key 158 of the piston enters keyway 160 of cylinder end 159. Rod 25 may now be turned to bring the cylinder end sections 154 and 155 into communication with each other through passage 150, and turned in the opposite direction to shift enlargement 144 back into piston socket 145 to close off passage 150, thereby breaking the communication between sections 154 and 155.

When this hydraulic control apparatus is installed in a boat, rod 25 of slave cylinder 17 is rotated to bring end sections 154 and 155 of the cylinder into communication with each other. Then each of the steering wheels 34 and 36 are rotated back and forth until all the fluid in the system has passed into and through reservoir 60. Any air entrapped in the fluid leaves the latter when the fluid reaches the reservoir of control valve 12. The entire system can be completely purged of air in a very short time, and then rod 25 is rotated to break the communication between cylinder sections 154 and 155. After this has been done, piston 24 is moved back and forth through cylinder 17 when any one of the steering wheels 34 or 36 is rotated back and forth.

If the boat travels through the water with rudder 28 at an angle to the general direction of travel, as is frequently the case, the pressure of the water against the rudder cannot straighten it out relative to the boat since the check valves in control valves 12 and 14 provide a hydraulic lock so that piston 24 cannot move in the slave cylinder, and the rudder is maintained in the set position.

What I claim as my invention is:

1. Hydraulic control apparatus comprising a housing having a gear pump therein operable selectively to direct fluid through main passages having check valves therein to either of two operating ports in the housing, a reservoir adapted to direct fluid through check valves to opposite sides of the pump, return passages in the housing adapted to direct fluid through additional check valves from the operating ports to the reservoir, a shuttle valve in the housing movable to close either return passage and simultaneously open the other return passage, means on the shuttle valve adapted to open the check valve of either return passage when the valve is moved to open said either return passage, and passage means extending from opposite sides of the pump to direct pressure fluid from said pump to move the shuttle valve to close either return passage when the pump is directing fluid to the operating port of the latter return passage.

2. Hydraulic control apparatus comprising a housing having spaced first and second operating ports, a gear pump mounted in the housing, first and second main passages extending from opposite sides of the pump to the first and second ports and having valves therein opening towards their respective ports, a reservoir, first and second supply passages extending from the reservoir to the first and second main passages and having check valves therein opening away from the reservoir, first and second return passages extending from the reservoir to the first and second operating ports with check valves therein opening towards said ports, first and second interconnected shuttle valves adapted to close both the first and second return passages and movable to open the first return passage while keeping the second return passage closed and vice versa, means on the first and second shuttle valves adapted to open the check valves of the first and second return passages when the shuttle valves are moved to open said first and second return passages respectively, and passage means extending from the first and second main passages and positioned to direct pressure fluid from the pump to move the first and second shuttle valves respectively to open the second and first return passages and their respective check valves.

3. Hydraulic control apparatus as claimed in claim 2 in which the reservoir is open to atmosphere to permit air to escape from fluid therein.

4. Hydraulic control apparatus comprising a housing having spaced operating ports, a main passage extending from one port to the other, a gear pump controlling the main passage and dividing said passage into said first and second sections, said pump being adapted selectively to direct fluid from either passage section to the other passage section, a check valve in each passage section opening towards the port of said each section, a reservoir, first and second return passages extending from the reservoir one to each port, a check valve in each return passage opening towards the port of said each return passage, interconnected first and second shuttle valves movable to close the first return passage and open the second return passage respectively and vice versa, means on the first and second shuttle valves for respectively opening the check valves of the first and second return passages when said shuttle valves are moved to open the first and second return passages respectively, supply passages extending from the reservoir to the first and second passage sections, check valves in the supply passages opening away from the reservoir, passage means extending from the first and second passage sections and adapted to direct pressure fluid therefrom respectively against the first and second shuttle valves, whereby pressure fluid from the pump to the first or second passage section and the operating port thereof is also directed against the first or second shuttle valve respectively to move the shuttle valves to open the second or first return passage and to open the check valve of said second or first return passage.

5. Hydraulic control apparatus as claimed in claim 4 in which the reservoir is open to atmosphere to permit air to escape from fluid therein.

6. Hydraulic control apparatus as claimed in claim 4 including yieldable means normally retaining the shuttle valves in positions closing the first and second return passages.

7. Hydraulic control apparatus comprising a housing having a gear pump therein operable selectively to direct fluid through main passages having check valves therein to either of two operating ports in the housing, a reservoir adapted to direct fluid through check valves to opposite sides of the pump, return passages in the housing adapted to direct fluid through additional check valves from the operating ports to the reservoir, valve means in the housing operable by pressure fluid from said pump to close either return passage and simultaneously open the other return passage, opening means operated by said valve means to open the check valve of either return passage when said valve means is opening said either return passage, and passage means extending from opposite sides of the pump to direct pressure fluid to operate said valve means to close either return passage when the pump is directing fluid to the operating port of the latter return passage.

8. Hydraulic control apparatus comprising a housing having a gear pump therein operable selectively to direct fluid through check valves to either of two operating ports in the housing, a reservoir adapted to direct fluid through the check valves to opposite sides of the pump, return passages in the housing adapted to direct fluid through check valves from the operating ports to the reservoir, valve means in the housing operable by pressure fluid from said pump to close either return passage and simultaneously open the other return passage, opening means operated by said valve means to open the check valve of either return passage when said valve means is opening said either return passage, passage means extending from opposite sides of the pump to direct pressure fluid to operate said valve means to close either return passage when the pump is directing fluid to the operating port of the latter return passage, a slave cylinder having pipes connecting opposite ends thereof to said operating ports of the housing, a piston and rod assembly with the piston slidably mounted in the cylinder and the rod slidably extending through an end of the cylinder, said rod being movable relative to the piston, and passage means in said assembly adapted to bring the section of the cylinder on one side of the piston into communication with the section of the cylinder on the opposite side of said piston, said rod being movable into a first position to close off said passage means and into a second position opening the passage means, at which time the gear pump can be operated to direct fluid through the cylinder and to the reservoir.

9. Hydraulic control apparatus comprising a housing having a gear pump therein operable selectively to direct fluid through check valves to either of two operating ports in the housing, a reservoir adapted to direct fluid through check valves to opposite sides of the pump, return passages in the housing adapted to direct fluid through check valves from the operating ports to the reservoir, valve means in the housing operable by pressure fluid from said pump to close either return passage and simultaneously open the other return passage, opening means operated by said valve means to open the check valve of either return passage when said valve means is opening said either return passage, passage means extending from opposite sides of the pump to direct pressure fluid to operate said valve means to close either return passage when the pump is directing fluid to the operating port of the latter return passage, a slave cylinder having pipes connecting opposite ends thereof to said operating ports of the housing, a piston and rod assembly with the piston slidably mounted in the cylinder and the rod slidably extending through an end of the cylinder, said rod being rotatable relative to the piston, means in the cylinder preventing rotation of the piston when the rod is rotated, and passage means in said assembly adapted to bring the section of the cylinder on one side of the piston into communication with the section of the cylinder on the opposite side of said piston, said rod being rotatable into a first position to close off said passage means and into a second position opening the passage means, at which time the gear pump can be operated to direct fluid through the cylinder and to the reservoir.

10. Hydraulic control apparatus comprising a housing having a gear pump therein operable selectively to direct fluid through check valves to either of two operating ports in the housing, a reservoir adapted to direct fluid through check valves to opposite sides of the pump, return passages in the housing adapted to direct fluid through check valves from the operating ports to the reservoir, valve means in the housing operable by pressure fluid from said pump to close either return passage and simultaneously open the other return passage, opening means operated by said valve means to open the check valve of either return passage when said valve means is opening said either return passage, passage means extending from opposite sides of the pump to direct pressure fluid to operate said valve means to close either return passage when the pump is directing fluid to the operating port of the latter return passage, a slave cylinder having pipes connecting opposite ends thereof to said operating ports of the housing, a piston and rod assembly with the piston slidably mounted in the cylinder and the rod slidably extending through a first end of the cylinder, said rod being rotatable relative to the piston, co-operating means on the piston and a second end of the cylinder for preventing rotation of the piston when the latter is moved against said second end, and passage means in said assembly adapted to bring the section of the cylinder on one side of the piston into communication with the section of the cylinder on the opposite side of said piston, said rod being rotatable into a first position to close off said passage means and into a second position opening the passage means, at which time the gear pump can be operated to direct fluid through the cylinder and to the reservoir.

11. Hydraulic control apparatus comprising a housing having a reversible pump operable selectively to direct fluid through main passages having check valves therein to either of two operating ports in the housing, a reservoir adapted to direct fluid through check valves to opposite sides of the pump, return passages in the housing adapted to direct fluid through additional check valves from the operating ports to the reservoir, a shuttle valve in the housing movable to close either return passage and simultaneously open the other return passage, means on the shuttle valve adapted to open the check valve of either return passage when the valve is moved to open said either return passage, and passage means extending from opposite sides of the pump to direct pressure fluid from said pump to move the shuttle valve to close either return passage when the pump is directing fluid to the operating port of the latter return passage.

12. Hydraulic control apparatus comprising a housing having spaced first and second operating ports, a reversible pump mounted in the housing, first and second main passages extending from opposite sides of the pump to the first and second ports and having valves therein opening towards their respective ports, a reservoir, first and second supply passages extending from the reservoir to the first and second main passages and having check valves therein opening away from the reservoir, first and second return passages extending from the reservoir to the first and second operating ports with check valves therein opening towards said ports, first and second interconnected shuttle valves adapted to close both the first and second return passages and movable to open the first return passage while keeping the second return passage closed and vice versa, means on the first and second shuttle valves adapted to open the check valves of the first and second return passages when the shuttle valves are moved to open said first and second return passages respectively, and passage means extending from the first and second main passages and positioned to direct pressure fluid from the pump to move the first and second shuttle valves respectively to open the second and first return passages and their respective check valves.

13. Hydraulic control apparatus comprising a housing having spaced operating ports, a main passage extending from one port to the other, a reversible pump controlling the main passage and dividing said passage into first and second sections, said pump being adapted selectively to direct fluid from either passage section to the other passage sections, a check valve in each passage section opening towards the port of said each section, a reservoir, first and second return passages extending from the reservoir one to each port, a check valve in each return passage opening towards the port of said each return passage, interconnected first and second shuttle valves movable to close the first return passage and open the second return passage respectively and vice versa, means on the first and second shuttle valves for respectively opening the check valves of the first and second return passages when said shuttle valves are moved to open the first and second return passages respectively, supply passages extending from the reservoir to the first and second passage sections, check valves in the supply passages opening away from the reservoir, passage means extending from the first and second passage sections and adapted to direct pressure fluid therefrom respectively against the first and second shuttle valves, whereby pressure fluid from the pump to the first or second passage section and the operating port thereof is also directed against the first or second shuttle valve respectively to move the shuttle valves to open the second or first return passage and to open the check valve of said second or first return passage.

14. Hydraulic control apparatus comprising a housing having a reversible pump therein operable selectively to direct fluid through check valves to either of two operating ports in the housing, a reservoir adapted to direct fluid through check valves to opposite sides of the pump, return passages in the housing adapted to direct fluid through check valves from the operating ports to the reservoir, valve means in the housing oeprable by pressure fluid from said pump to close either return passage and simultaneously open the other return passage, opening means operated by said valve means to open the check valve of either return passage when said valve means is opening said either return passage, passage means extending from opposite sides of the pump to direct pressure fluid to operate said valve means to close either return passage when the pump is directing fluid to the operating port of the latter return passage, a slave cylinder having pipes connecting opposite ends thereof to said operating ports of the housing, a piston and rod assembly with the piston slidably mounted in the cylinder and the rod slidably extending through an end of the cylinder, said rod being movable relative to the piston, and passage means in said assembly adapted to bring the section of the cylinder on one side of the piston into communication with the section of the cylinder on the opposite side of said piston, said rod being movable into a first position to close off said passage means and into a second position opening the passage means, at which time the pump can be operated to direct fluid through the cylinder and to the reservoir.

15. Hydraulic control apparatus comprising a housing having a reversible pump therein operable selectively to direct fluid through check valves to either of two operating ports in the housing, a reservoir adapted to direct fluid through check valves to opposite sides of the pump, return passages in the housing adapted to direct fluid through check valves from the operating ports to the reservoir, valve means in the housing operable by pressure fluid from said pump to close either return passage and simultaneously open the other return passage, opening means operated by said valve means to open the check valve of either return passage when said valve means is opening said either return passage, passage means extending from opposite sides of the pump to direct pressure fluid to operate said valve means to close either return passage when the pump is directing fluid to the operating port of the latter return passage, a slave cylinder having pipes connecting opposite ends thereof to said operating ports of the housing, a piston and rod assembly with the piston slidably mounted in the cylinder and the rod slidably extending through an end of the cylinder, said rod being rotatable relative to the piston, means in the cylinder preventing rotation of the piston when the rod is rotated, and passage means in said assembly adapted to bring the section of the cylinder on one side of the piston into communication with the section of the cylinder on the opposite side of said piston, said rod being rotatable into a first position to close off said passage means and into a second position opening the passage means, at which time the pump can be operated to direct fluid through the cylinder and to the reservoir.

16. Hydraulic control apparatus comprising a housing having a reversible pump therein operable selectively to direct fluid through check valves to either of two operating ports in the housing, a reservoir adapted to direct fluid through check valves to opposite sides of the pump, return passages in the housing adapted to direct fluid through check valves from the operating ports to the reservoir, valve means in the housing operable by pressure fluid from said pump to close either return passage and simultaneously open the other return passage, opening means operated by said valve means to open the check valve of either return passage when said valve means is opening said either return passage, passage mean extending from opposite sides of the pump to direct pressure fluid to operate said valve means to close either return passage when the pump is directing fluid to the operating port of the latter return passage, a slave cylinder having pipes connecting opposite ends thereof to said operating ports of the housing, a piston and rod assembly with the piston slidably mounted in the cylinder and the rod slidably extending through a first end of the cylinder, said rod being rotatable relative to the piston, co-operating means on the piston and a second end of the cylinder for preventing rotation of the piston when the latter is moved against said second end, and passage means in said assembly adapted to bring the section of the cylinder on one side of the piston into communication with the section of the cylinder on the opposite side of said piston, said rod being rotatable into a first position to close off said passage means and into a second position opening the passage means, at which time the pump can be operated to direct fluid through the cylinder and to the reservoir.

References Cited by the Examiner
UNITED STATES PATENTS

| | | | |
|---|---|---|---|
| 2,755,625 | 7/1956 | Acton | 60—52 |
| 2,916,879 | 12/1959 | Gondek | 60—52 |
| 3,164,959 | 1/1965 | Gondek | 60—52 |

SAMUEL LEVINE, *Primary Examiner.*

EDGAR W. GEOGHEGAN, *Examiner.*